United States Patent [19]

Ishii et al.

[11] 3,866,069

[45] Feb. 11, 1975

[54] HIGH VOLTAGE GENERATING DEVICE

[75] Inventors: Akira Ishii, Katano; Kaneichi Kondo, Settsu; Kenichi Uchibori, Neyagawa, all of Japan

[73] Assignee: Matsushita Electric Industrial Co., Ltd., Osaka, Japan

[22] Filed: Sept. 4, 1973

[21] Appl. No.: 394,270

[30] Foreign Application Priority Data
Sept. 7, 1972  Japan.................. 47-105007[U]
Nov. 20, 1972  Japan.................. 47-134217[U]
Dec. 13, 1972  Japan.................. 47-143507[U]

[52] U.S. Cl............. 310/8.7, 310/9.4, 317/DIG. 11
[51] Int. Cl............................................. H04r 17/00
[58] Field of Search ............... 310/8.3, 8.7, 9.1, 9.4; 317/DIG. 11, 81, 79

[56] References Cited
UNITED STATES PATENTS
3,449,637  6/1969  Suzuki ............................ 310/8.7 X
3,509,388  4/1970  Mifune et al. ..................... 310/8.7
3,541,360  11/1970  Tonari ............................... 310/8.7
3,729,639  4/1973  Heinouchi......................... 310/8.7 X Primary Examiner—Mark O. Budd
Attorney, Agent, or Firm—Stevens, Davis, Miller & Mosher

[57] ABSTRACT

In a high voltage generating device of impact type using a piezoelectric element, which is utilized for lighting of cigarette lighters or gas burning instruments or the like, the invention particularly relates to improvements in an inner casing accommodating an impact element in such device so as to improve the mechanical strength of the casing and facilitate the assemblage of the component parts.

2 Claims, 13 Drawing Figures

PATENTED FEB 11 1975 3,866,069

HIGH VOLTAGE GENERATING DEVICE

This invention relates to high voltage generating devices using a piezoelectric element, which is utilized for lighting of cigarette lighters or gas burning instruments or the like and, more particularly, to improvements in the casing accommodating an impact element in such devices for improving the mechanical strength and facilitating the assemblage of component parts.

More specifically, the invention concerns a high voltage generating device of the type producing a high voltage by giving an impact to the piezoelectric element by means of an impact spring, in which the piezoelectric element is held in a fixed position within an outer casing and adapted to be struck by an impact element accommodated in an inner casing slidably fitted in the outer casing, the impact element being connected to an impact spring mounted also in the inner casing such that it can provide a torsional restraining force.

In the prior art device of the afore-mentioned type, the mechanical structure provided on the outer casing for guiding the operation of the impact element tends to weaken the mechanical strength of the casing. Also, the structure for mounting the impact element and impact spring are not sufficient in general in view of the assembling efficiency. The present invention is to provide a high voltage generating device, which can solve the above problems and can ensure high production efficiency and high yield.

More particularly, an object of the invention is to provide a high voltage generating device comprising an outer casing made of a synthetic resin material and accommodating a piezoelectric element unit, an inner casing slidably inserted in the outer casing, a return spring disposed within the outer casing, an impact element accommodated within the inner casing, an impact spring accommodated in the inner casing and connected to the impact element, said impact spring being twisted and imparted with a torsional restraining force, said impact element having an impact element pin extending from the periphery of the impact element and received in a window having an inclined portion formed in said inner casing and also in a window having a stepped portion formed in said outer casing.

Another object of the invention is to provide a high voltage generating device of the above-mentioned type having an impact spring for giving an impact to a piezoelectric element unit, said impact spring being mounted such that it can provide a torsional restraining force with its opposite end portions bent in a direction at right angles to the axial direction, one of said end portions being fitted in a groove formed in a seat provided in the impact element and the other end portion fitted in a groove formed in a seat provided in an inner casing.

A further object of the invention is to provide a high voltage generating device comprising an outer casing made of a synthetic resin material and accommodating a piezoelectric element unit, an inner casing slidably inserted in the outer casing, a return spring disposed within the outer casing, an impact element accommodated within the inner casing, an impact spring also accommodated in the inner casing and connected to the impact element, said impact spring being twisted and imparted with a torsional restraining force, said impact element having an impact element pin extending from the periphery of the impact element and received in a window having an inclined portion formed in said inner casing and also in a window having a stepped portion formed in said outer casing, said inner casing accommodating said impact element and said impact spring having a cylindrical guide bore including a spring end guide, and end portion of said impact spring being fitted in said spring end guide.

The problems encountered with the prior art device and construction of and effects obtainable with preferred embodiments of the present invention will now be described in detail with reference to the accompanying drawings, in which.

Throughout the drawing, like reference numerals designate like parts.

Figure 1:
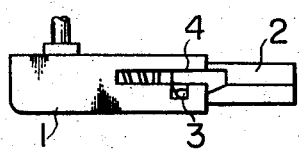
FIG. 1 is a front view of a prior art high voltage generating device.

The prior art high voltage generating device of the afore-mentioned type, particularly one used for a pocket cigarette lighter, has a construction as shown in FIG. 1. It has an outer casing 1 and an inner casing, both made from a metal plate. The outer casing 1 is formed with a groove or open slot, in which a pin 3 of an impact element accommodated in the inner casing 2 is received.

With the groove 1 formed in the outer casing 1 at one end thereof, however, the outer casing 1 is likely to be deformed or broken in the event the inner casing 2 is moved with respect to the outer casing 1 for applying an impact force to a piezoelectric element unit accommodated in the outer casing 1. This would result since forces are exerted on the groove 4, and ultimately the device will become incapable of allowing normal sliding movement of the inner casing 2, which is a great disadvantage with regard to the service life.

From the above ground, there has recently been developed a structure, in which, instead of forming a groove or open slot in the outer casing, a pin is fitted in and secured to an impact element after the outer and inner casings are assembled together. However, since very small space is available for the operation of fitting and securing the pin, the processibility is inferior. Also, the mechanical strength of the secured part is not sufficient. Further, in this structure both the outer and inner casings must be formed with a window or opening for fitting the pin, so that the mechanical strength of the casings themselves is reduced.

FIGS. 2 to 5 show an embodiment of the invention, which is intended to solve the above problem.

Figure 2:
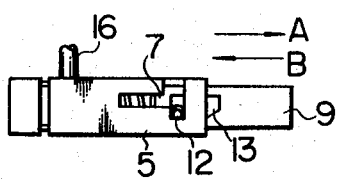
FIG. 2 is a front view of an embodiment of the high voltage generating device according to the invention.
Figure 3:
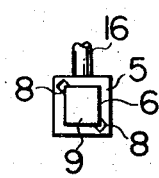
FIG. 3 is a side view of the same embodiment.
Figure 4:
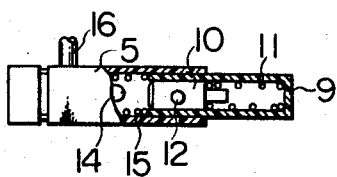
FIG. 4 is a front view, partly in section, of the same embodiment.

Referring to FIG. 2, numeral 5 designates an outer casing made of a synthetic resin and accommodating a piezoelectric element unit 14. It is open at one end as indicated at 6, and it is formed in one side wall with a substantially T-shaped window 7. Also, the outer casing 5 is formed with pin grooves 8 in diagonally opposite corners and terminating in the opening 6.

Numeral 9 designates an inner casing slidably fitted in the outer casing 5. Within the inner casing 9 an impact element 10 and an impact spring 11 are accommodated. The impact element 10 is provided with an integral pin 12, which projects through a cam window 13 formed in one side wall of the inner casing 9 to the outside.

Between the piezoelectric element unit 14 and the inner casing 9 a return spring 15 is provided.

Figure 5:
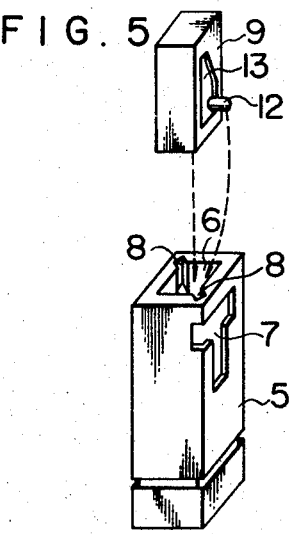
FIG. 5 is an exploded perspective view of the same embodiment.

FIG. 5 shows the assemblage of the above construction. The inner casing 9 is inserted into the outer casing 5 with the pin 12 extending from the impact element 10 accommodated in the inner casing fitted in the pin grooves 8 formed in the outer casing 5 adjacent the opening 6 thereof. When the pin 12 reaches the T-shaped window 7, it is flung into the stepped portion of the window 7 due to torsional restoring force of the impact spring 11, so that the state shown in FIG. 2 is obtained.

In use, the inner casing 9 is moved in the direction of arrow B in FIG. 2 by pushing it against the force of the return spring 15. In an initial stage of this movement of the inner casing the impact element 10 will not move because its pin 12 is engaged in the stepped portion of the window 7 of the outer casing 5, so that the impact spring 11 is compressed to store impact energy therein. As the inner casing 9 is further displaced, an inclined portion of the cam window 13 formed in the inner casing 9 comes into engagement with the pin 12 and revolves it in the counterclockwise direction when viewed from the side of the piezoelectric element unit 14. With this action, the pin 12 is moved out of the stepped portion of the window 7, whereupon the impact element 10 is brought into impingement against an impact metal of the piezoelectric element unit 14 due to the energy stored in the impact spring 11, thus producing a high voltage from the piezoelectric element unit 14. The high voltage thus produced is taken out through leads 16. After the impingement, the inner casing 9 is released, whereupon it is returned in the direction of arrow A by the return spring 15. At the same time, the pin 12 is also returned in the direction of arrow A, and when it reaches the stepped portion of the window 7 it is flung into the stepped portion by the torsional restoring force of the impact spring 11, thus recovering the initial state.

It will be understood that the high voltage generating device according to the invention can be simply assembled and that its casings provide sufficient mechanical strength to ensure reliable and smooth frictional movement of the outer and inner casings relative to each other. Thus, it is possible to ensure long service life and provide high quality. Also, the device is very advantageous in view of the cost.

FIGS. 6 to 10 show a second embodiment of the invention, which is intended to improve the efficiency of assemblage of the prior art device of this type in connection with means for mounting the impact spring.

Figure 6:
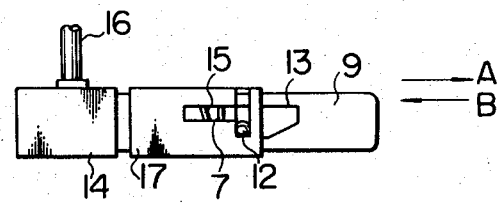
FIG. 6 is a front view of a second embodiment of the high voltage generating device according to the invention.
Figure 7:
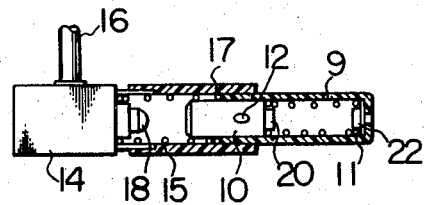
FIG. 7 is a sectional view of the second embodiment.
Figure 8:
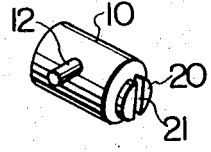
FIG. 8 is a perspective view of an impact element in the second embodiment.
Figure 9:
FIG. 9 is a perspective view of a spring seat in the second embodiment.
Figure 10:
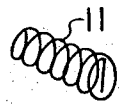
FIG. 10 is a perspective view of an impact spring in the second embodiment.

Referring to FIG. 6, numeral 14 designates a piezoelectric element unit, which is secured by means of bolting or corking to one end of an outer casing 17. A return spring 15 is accommodated within the outer casing 17. Slidably fitted in the outer casing 17 is an inner casing 9 accommodating an impact element 10 and an impact spring 11, the impact element being capable of impinging against an impact metal 18 of the piezoelectric element unit 14. The outer and inner casings 17 and 9 are formed in their one side wall with respective windows 7 and 13, and a pin 12 projecting from the periphery of the impact element 10 is received in these windows 7 and 13. These windows may of course be similar to those in the previous embodiment. The impact spring 11 is mounted such that the impact element pin 12 may be held stationary in the stepped portion of the window 7 by its torsional restoring force and that it urges the inner casing 9 in the direction of arrow A with its compressive restoring force. The impact spring 11 has opposite bent end portions extending in a direction at right angles to the axial direction, with one end portion fitted in a groove 21 formed in a seat 20 provided in the impact element 10 and the other end portion similarly fitted in a groove 23 formed in a spring seat 22 provided in the inner casing 9. In this way, the impact spring 11 is mounted in very stable state. Numeral 16 designates leads for taking out the high voltage from the piezoelectric element unit 14.

In operation, in an initial stage of movement of the inner casing 9 brought about by pushing it in the direction of arrow B against the force of the return spring 15, the impact element is not moved since the pin 12 is engaged in the stepped portion of the window 7, thus compressing the impact spring 11 to store impact energy therein. As the inner casing 9 is moved further in the direction of arrow B, an inclined portion of the window 13 formed in the inner casing 9 comes into engagement with the pin 12 and revolves it in the counterclockwise direction when viewed from the side of the piezoelectric element unit 14. With this action, the pin 12 is released from the stepped portion of the window 7, whereupon the impact element 10 is brought into impingement against the impact metal 18 of the piezoelectric element unit 14 due to the energy stored in the impact spring 11 to produce a high voltage from the piezoelectric element unit 14, the voltage thus produced being taken out through the leads 16. After this impingement the inner casing is released, whereupon it is returned in the direction of arrow A by the action of the return spring 15. At the same time, the pin 12 is also returned in the direction of arrow A, and when it reaches the stepped portion of the window 7 it is flung into the stepped portion by the torsional restoring force of the impact spring 11, thus recovering the initial state.

In the prior art high voltage generating device of this type, the impact spring has its opposite end portions bent in the axial direction and inserted, in the twisted state of the spring, in respective small holes slightly greater than the diameter of the width of the spring formed respectively in the impact element and inner casing. In this way, the impact spring is given torsional restoring force. In such construction, however, the impact spring is prone to insertion failure because it is likely to buckle when it is twisted and also because the bent end portions are likely to have a radius of curvature R, thus reducing the production efficiency and yield.

In the high voltage generating device of the above construction according to the invention, the opposite end portions of the impact spring are bent in the direction perpendicular to the axial direction and fitted in the grooves of the spring seats of the impact element and the inner casing, thereby imparting torsional and compressive restoring forces to the spring. Thus, failure of twisting and failure of insertion due to incomplete bending at the time of assemblage can be eliminated, so that it is possible to improve the production efficiency and yield. Further, this construction is particularly effective where the outer and inner casings are cylindrical and cannot provide any stopper or point of twisting force by their shape in situ unlike rectangular shape.

Figure 11:
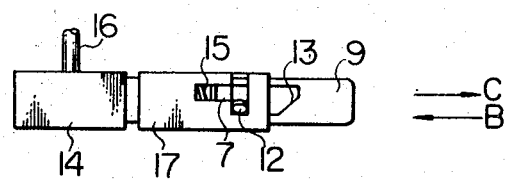
FIG. 11 is a front view of a third embodiment of the high voltage generating device according to the invention.
Figure 12:
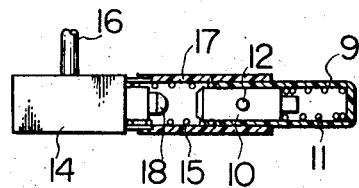
FIG. 12 is a sectional view of the third embodiment.
Figure 13:
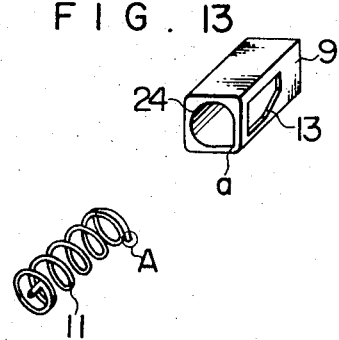
FIG. 13 is a perspective view showing an inner casing and an impact spring in the third embodiment.

FIGS. 11 to 13 show a third embodiment of the invention, which is intended to improve the efficiency of assemblage of the prior art device of this type in connection with means for mounting impact element and impact spring.

Referring to FIG. 11, numeral 14 designates a piezoelectric element unit, which is secured by means of bolting or corking to one end of an outer casing 17. A return spring 15 is accommodated within the outer casing 17. Slidably fitted in the outer casing 17 is an inner casing 9 accommodating an impact element 10 and an impact spring 11, the impact element being capable of impinging against an impact metal 18 of the piezoelectric element unit 14. The outer and inner casings 17 and 9 are formed in their one side wall with respective windows 7 and 13, and a pin 12 projecting from the periphery of the impact element 10 is received in these windows 7 and 13. These windows may be similar to those in the previous embodiment. The impact spring 11 is mounted such that the impact element pin 12 may be held stationary in engagement in the stepped portion of the window 7. At the time of assembling the impact element 10 and impact spring 11 the impact spring 11 is inserted in guide bore 24 having a circular sectional profile formed in an inner casing 9 with an end A of the spring 11 fitted in an end retaining guide *a* formed as part of the guide bore 24, and the impact spring 11 is previously twisted in the counterclockwise direction when viewed from the side of the piezoelectric element unit 14. Thus, a restraining force always acts upon the impact element 10 and impact spring 11 in the clockwise direction.

In operation, in an initial stage of movement of the inner casing 9 brought about by pushing it in the direction of arrow B against the force of the return spring 15, the impact element 10 is not moved since the pin 12 is engaged in the stepped portion of the window 7, thus compressing the impact spring 11 to store impact energy therein. As the inner casing 9 is moved further, the inclined portion of the window formed in the inner casing 9 comes into engagement with the pin 12 and revolves it in the counterclockwise direction when viewed from the side of the piezoelectric element unit 14. As a result, the pin 12 is released from the stepped portion of the window 7, whereupon the impact element 10 is brought into impingement against the impact metal of the piezoelectric element unit 14 due to the energy stored in the impact spring 11 to produce a high voltage from the piezoelectric element unit 14, the voltage thus produced being taken out through the leads 16. After this impingement the inner casing is released, whereupon it is returned in the direction of arrow C by the action of the return spring 15. At the same time, the pin 12 is also returned in the direction of arrow C, and when it reaches the stepped portion of the window 7 it is flung into the stepped portion by the torsional restraining force of the impact spring 11, thus recovering the initial state.

In the prior art high voltage generating device of this type, in the assemblage of the impact spring in the twisted state it may sometimes happen that its end is not anchored and rotated in the guide bore of the inner casing where the guide bore is rectangular and the impact element is cylindrical. This stems from insufficient guide for the impact element and impact spring.

In the high voltage generating device of the above construction according to the invention, the inner casing is formed with a guide bore having a shape conforming to the outer shape of the impact spring having the end portion, so that the rotation of the impact spring in the guide bore can be positively prevented. Also, the impact element and impact spring can be sufficiently guided.

What we claim is:

1. A high voltage generating device comprising:
   a. an outer casing made of a synthetic resin, said outer casing having an open end, a window with a stepped portion located in one side thereof and a pin groove in an internal surface of said outer casing connecting said open end to said window,
   b. a piezoelectric element located within said outer casing at one end thereof,
   c. an inner casing made of a synthetic resin slidably inserted within said outer casing, said inner casing having a bore with a spring end retaining guide formed therein and a window with an inclined portion located in one surface of said inner casing,
   d. an impact element having an impact pin extending from the periphery thereof, said impact element being slidably located within said inner casing with said impact pin projecting through the windows in said inner and outer casings, said impact pin being guided by said pin groove during assembly of said inner and outer casings to the window in said outer casing,
   e. an impact spring positioned within the bore of said inner casing with one end secured in said spring end retaining guide and the other end connected to said impact element, said impact spring being twisted to provide it with a torsional restraining force, and
   f. a return spring positioned within said outer casing between the piezoelectric element and said inner casing.

2. The high voltage generating device according to claim 1, wherein said impact spring has opposite bent end portions extending in a direction at right angles to its axis, one of said end portion being fitted in a groove formed in a seat provided in said impact element and the other end portion fitted in a groove formed in a seat provided in said inner casing.

* * * * *